(12) United States Patent
Moore et al.

(10) Patent No.: US 6,977,760 B1
(45) Date of Patent: Dec. 20, 2005

(54) BI-DIRECTIONAL PRESENTATION APPARATUS

(75) Inventors: Michael J. Moore, Beverly Hills, MI (US); Johna Bakker, Brighton, MI (US); Richard Woroniec, Brighton, MI (US); William Basse, Northville, MI (US)

(73) Assignee: Unisys Corporation, Blue Bell, PA (US)

( * ) Notice: Subject to any disclaimer, the term of this patent is extended or adjusted under 35 U.S.C. 154(b) by 705 days.

(21) Appl. No.: 09/924,269

(22) Filed: Aug. 7, 2001

(51) Int. Cl.$^7$ ............................................. H04N 1/04
(52) U.S. Cl. ..................... 358/474; 358/496; 358/498
(58) Field of Search ............................... 358/474, 497, 358/496, 498; 271/184, 186, 902

(56) References Cited

U.S. PATENT DOCUMENTS

| | | | |
|---|---|---|---|
| 4,872,061 A | * | 10/1989 | Uchiyama .................. 358/400 |
| 5,788,227 A | * | 8/1998 | Hendrix et al. ............... 271/3.2 |
| 6,069,715 A | * | 5/2000 | Wang ......................... 358/498 |
| 6,443,446 B1 | * | 9/2002 | Kiesow et al. ............... 271/184 |
| 2002/0001105 A1 | * | 1/2002 | Takaki et al. ............... 358/474 |

* cited by examiner

*Primary Examiner*—Kimberly Williams
*Assistant Examiner*—Negussie Worku
(74) *Attorney, Agent, or Firm*—Lise A. Rode; Mark T. Starr

(57) ABSTRACT

A presentation apparatus is provided for use with a contact image sensor used for scanning the contents of a document. The presentation apparatus includes a base member adapted to be disposed above the surface of the contact image sensor, a first spring arm extending from the base member and a contact member extending vertically from the first spring arm. The first spring arm urges the contact member into contact with the surface for ensuring flat contact between the document and the surface as the document passes therebetween.

11 Claims, 6 Drawing Sheets

BI-DIRECTIONAL PRESENTATION APPARATUS

FIELD OF THE INVENTION

The present invention relates to contact image sensing and more particularly to a bi-directional presentation apparatus for improving the quality of contact image sensing.

BACKGROUND OF THE INVENTION

Scanners, digital copiers, fax machines and the like, commonly use contact image sensors (CIS) for scanning information written on various documents. CIS's generally include a glass window (CIS window), through which an image sensor scans the document. In order to achieve an accurate document scan, the document must be in close proximity to or "contact" the glass window. The optics of the image sensor are designed to achieve peak focus at the surface of the CIS window. Thus, the document must be in good contact with the CIS window to ensure scanning accuracy.

As noted, tight tolerances are required on the distance between the document and the CIS. To achieve this, flatbed scanners and copiers include large windows against which a document lies and a cover or lid closes over the document pushing the document flat against the window. The cover generally includes a foam compliant pad for urging the document into contact with the window. However, scanners and copiers having document feed capability cannot use static pad force to ensure proper contact between the document and the window. Such devices generally include a system of belt and driven presentation rollers for feeding the document past the CIS. Generally, a roller made of compliant material, or in some cases spring biased, is used and placed above the CIS to bias the passing document into contact with the CIS. Due to the tight tolerancing requirements discussed above, the distance between the roller center and the surface of the CIS window must be fairly precise. Sufficient increase or decrease in the distance between the roller and the scanner will affect the amount of drive force required to feed the document through the device. Further, foam rollers are difficult to maintain as they accumulate debris over time, adversely affecting the performance of the device.

Thus, it is desirable in the industry to provide a low cost, low maintenance presentation apparatus and method for biasing a document into sliding contact with a CIS window. Further, it is desirable to provide a presentation apparatus that improves the overall performance and cost effectiveness of an image-scanning device.

SUMMARY OF THE INVENTION

Accordingly, the present invention provides a presentation apparatus for biasing a document into contact with a surface. The presentation apparatus includes a base member adapted to be disposed above the surface, a first spring arm extending from the base member and a contact member extending vertically from the first spring arm. The first spring arm urges the contact member into contact with the surface for ensuring flat contact between the document and the surface as the document passes therebetween. The contact member preferably includes a bottom face having an arcuate portion. The arcuate portion provides an attack angle for enabling smooth reception of the document between said contact member and said scanning surface.

The present invention further provides an image-scanning device for scanning a document. The image-scanning device includes a scanning unit adapted to slidably receive the document therethrough, the scanning unit having a contact image sensor with a scanning surface, and a presentation apparatus disposed above the scanning surface. A drive assembly is also included for driving the document through the scanning unit. The presentation apparatus ensures flat contact between the document and the scanning surface as the document passes through the scanning unit.

The present invention includes many advantages over prior art devices. One advantage is improved image quality resulting from improved presentation contact between the document and the CIS. A second advantage of the present invention is a reduction in feed torque requirements since driven presentation rollers are foregone. Cost savings are also realized through the absence of the various supporting components driven presentation rollers require. A further advantage of the present invention is the ability to pass a wider range of document thicknesses for a given spacing between the presentation apparatuses and the CIS.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
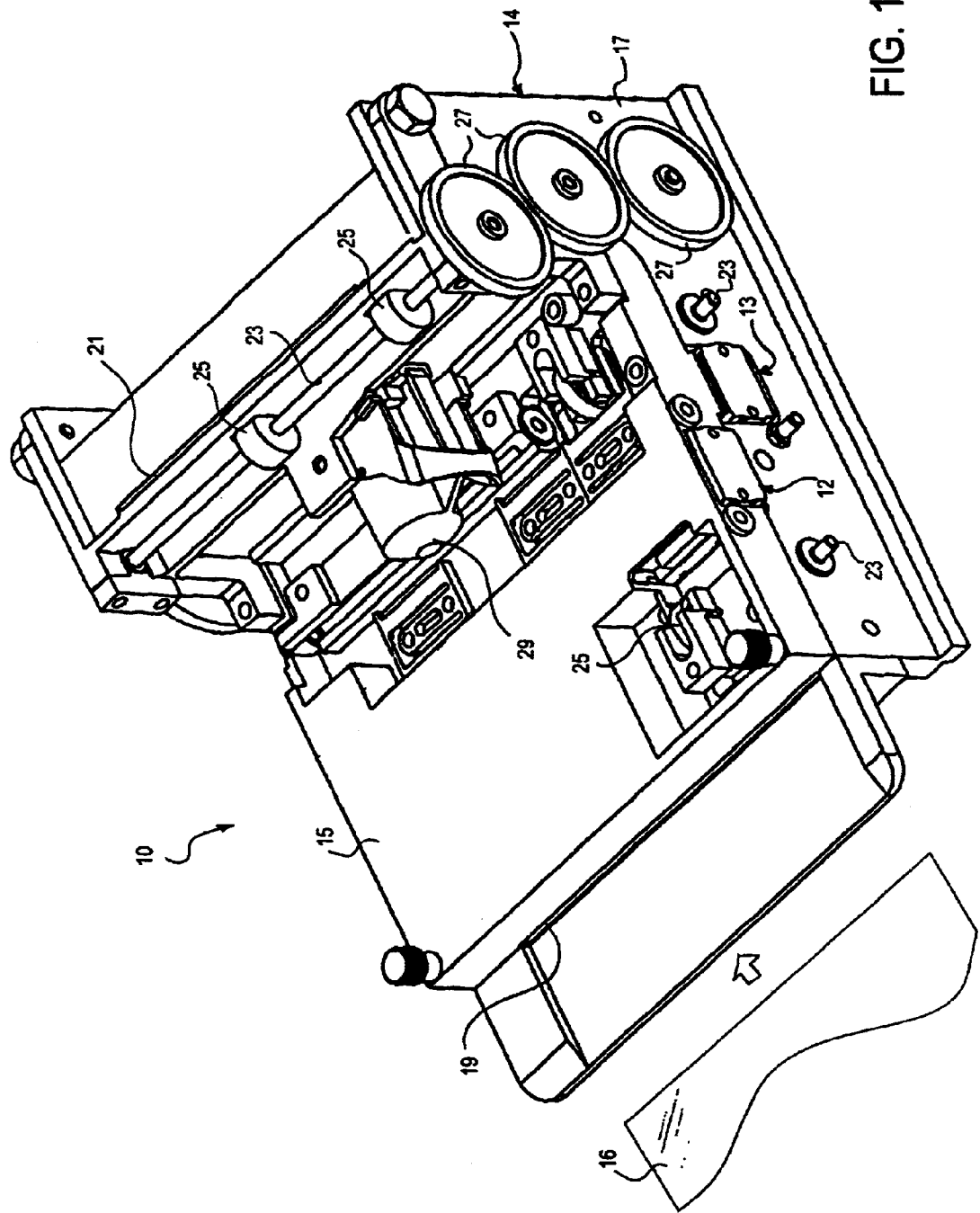
FIG. 1 is a perspective view of an image scanning device.
Figure 2:
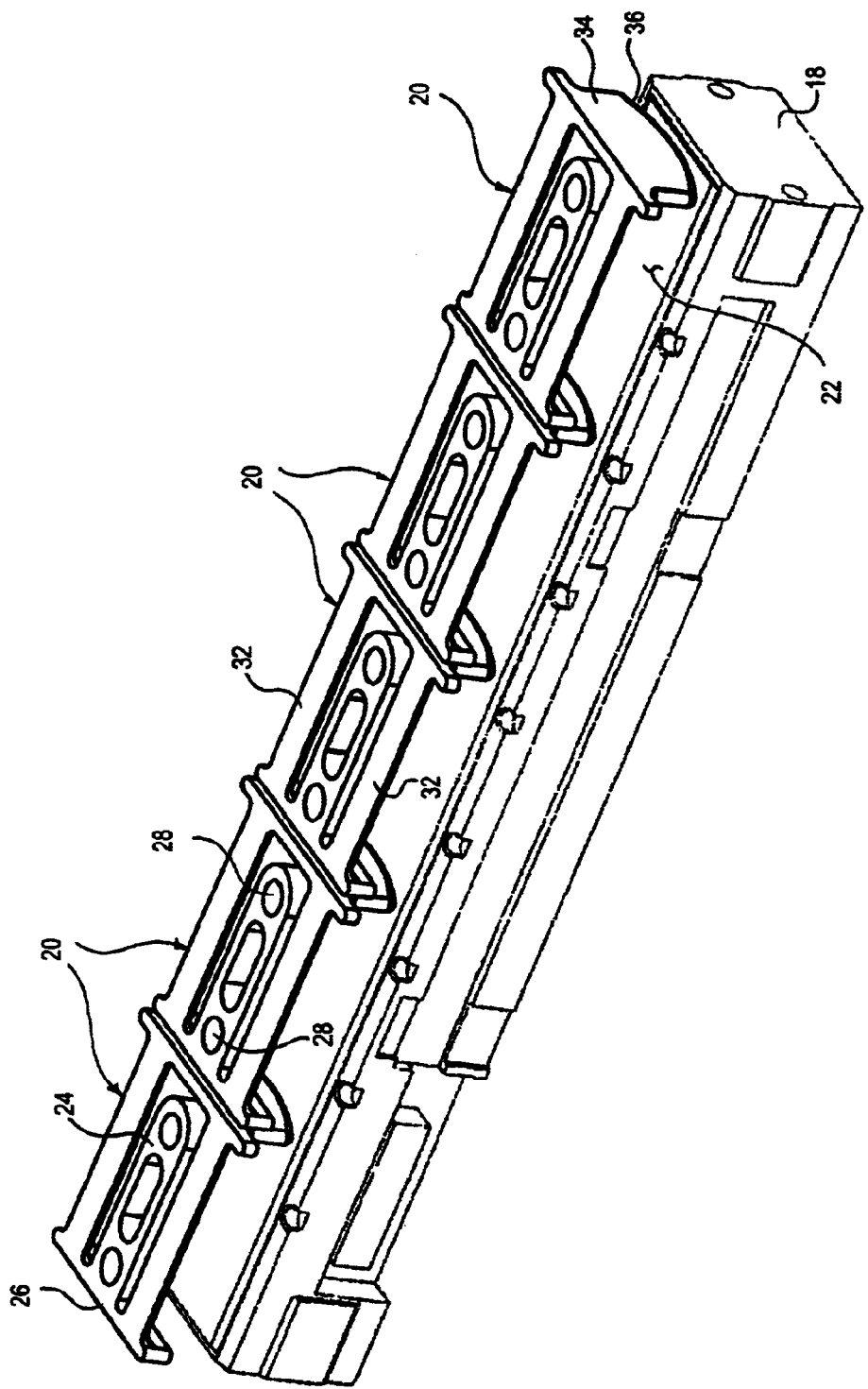
FIG. 2 is a perspective view of a sensing unit of the image scanning device of FIG. 1, including a contact image sensor and a plurality of bi-directional presentation apparatuses in accordance with the teachings of the present invention.
Figure 3:
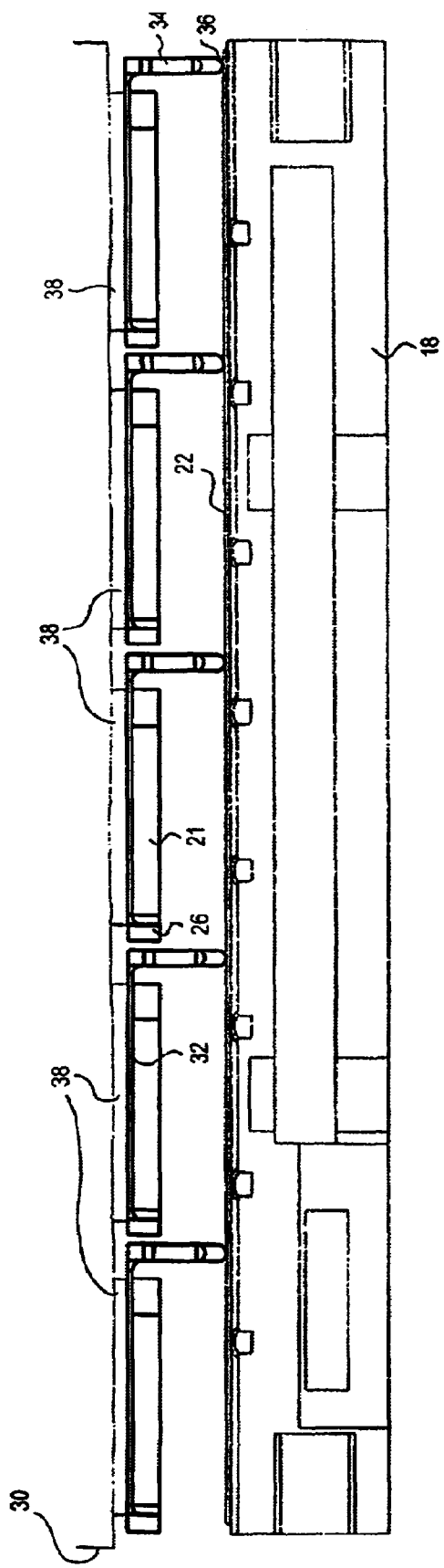
FIG. 3 is a side view of the sensing unit of FIG. 2.

With reference to FIG. 1, an image-scanning device 10 is shown. The image scanning device 10 may include any one of a number of devices known in the art, including, but not limited to, scanners, digital copiers, fax machines and the like. The image-scanning device includes an upper scanning unit 12 and a lower scanning unit 13 housed within a feeding system 14. The upper and lower scanning units 12,13 maintain a fixed position while the feeding system 14 drives a document 16 therethrough. In an exemplary embodiment, the image-scanning device 10 is bi-directional, whereby the feeding system 14 drives the document 16 through a first side of the upper and lower scanning units 12,13 then reverses direction and drives the document 16 back through. This embodiment is preferred in instances of sensitive document scanning where the first pass through the upper and lower scanning units 12,13 scans the document 16 and the second pass re-scans the document 16 to ensure accuracy. It will be appreciated, however, that the image-scanning device 10 may be uni-directional, whereby the feeding system 14 drives the document 16 through the upper and lower scanning units 12,13 in a single direction.

The feeding system 14 generally includes first and second housing halves 15,17 having an input slot 19 and an output slot 21. The output slot 21 of the present embodiment is indexed approximately 90° relative to the input slot 19. The feeding system 14 further includes a plurality of axles 23 having rollers 25 disposed thereon. Each axle 23 includes an end having a drive gear 27 disposed thereon and is in mesh with the drive gear 27 of an adjacent axle 23. A drive unit 29 is provided and is operably engaged with one of the axles 23 for driving the axle 23. The particular axle 23 in turn drives an adjacent axle 23, and so on, whereby each of the axles 23 is driven by the single drive unit 29. As the axles 23 are driven, the rollers 25 are caused to rotate and engage the document 16 as it is fed into the input slot 19. The rollers 25 then draw the document 16 through the upper and lower scanning units 12,13 for scanning.

With particular reference to FIGS. 2 through 5, the upper and lower scanning units 12,13 will be described in detail. It will be appreciated, however, that the upper and lower scanning units 12,13 are similarly constructed and therefore only the upper scanning unit 12 will be described in detail. The scanning unit 12 includes a contact image sensor (CIS) 18 and a plurality of bi-directional presentation apparatuses 20. The present embodiment implements five bi-directional presentation apparatuses 20 lined across the length of the CIS 18, however, it will be appreciated that this number may vary in accordance with specific design considerations. The CIS 18 includes a glass surface 22 that is slidably engaged by the document 16 as the document 16 is driven through the scanning unit 12. The bi-directional presentation apparatuses 20 sufficiently urge the document 16 into flat, sliding engagement with the glass surface 22 for ensuring quality scanning while enabling the document 16 to slide easily through the scanning unit 12. As discussed previously, CIS's are designed for peak focus at the glass surface. By providing flat contact between the document 16 and the glass surface 22 of the CIS 18, accurate focus, and thus quality scanning, is ensured.

Each of the bi-directional presentation apparatuses 20 are of the same construction, therefore only one bi-directional presentation apparatus 20 will be discussed in detail. The bi-directional apparatus 20 includes a base member 24 having a cross-member 26 extending horizontally across an end. The base member 24 further includes apertures 28 for receiving bolts or screws (not shown) therethrough. The bolts or screws serve to fixedly attach the bi-directional presentation apparatus 20 to a structure 30 of the scanning unit 12. Cantilever arms 32 extend from the cross-member 26 on either side of the base member 24, running generally parallel thereto. A contact member 34 extends vertically from the cantilever arms 32 and interconnects the cantilever arms 32. As the document 16 passes through the scanning unit 12 it passes between the glass surface 22 and a bottom edge 36 of the contact member 34. The cantilever arms 32 provide a spring action for the contact member 34, thereby enabling the contact member 34 to bias the document 16 into flat contact with the glass surface 22.

Spacers 38 are optionally provided between each bi-directional presentation apparatus 20 and the structure 30. The spacers 38 are approximately of the same general shape as the base members 24 and serve to space the corresponding bi-directional presentation apparatus 20 from the structure 30 for enabling vertical motion of the cantilever arms 32 and contact member 34, as described in detail hereinbelow. It will be appreciated, however, that the spacers 38 may be integrally formed with the structure 30, or substituted for other means that serve to space the bi-directional presentation apparatus 20 away from the structure 30 for providing sufficient space for flexure of the cantilever arms 32.

Figure 4A:
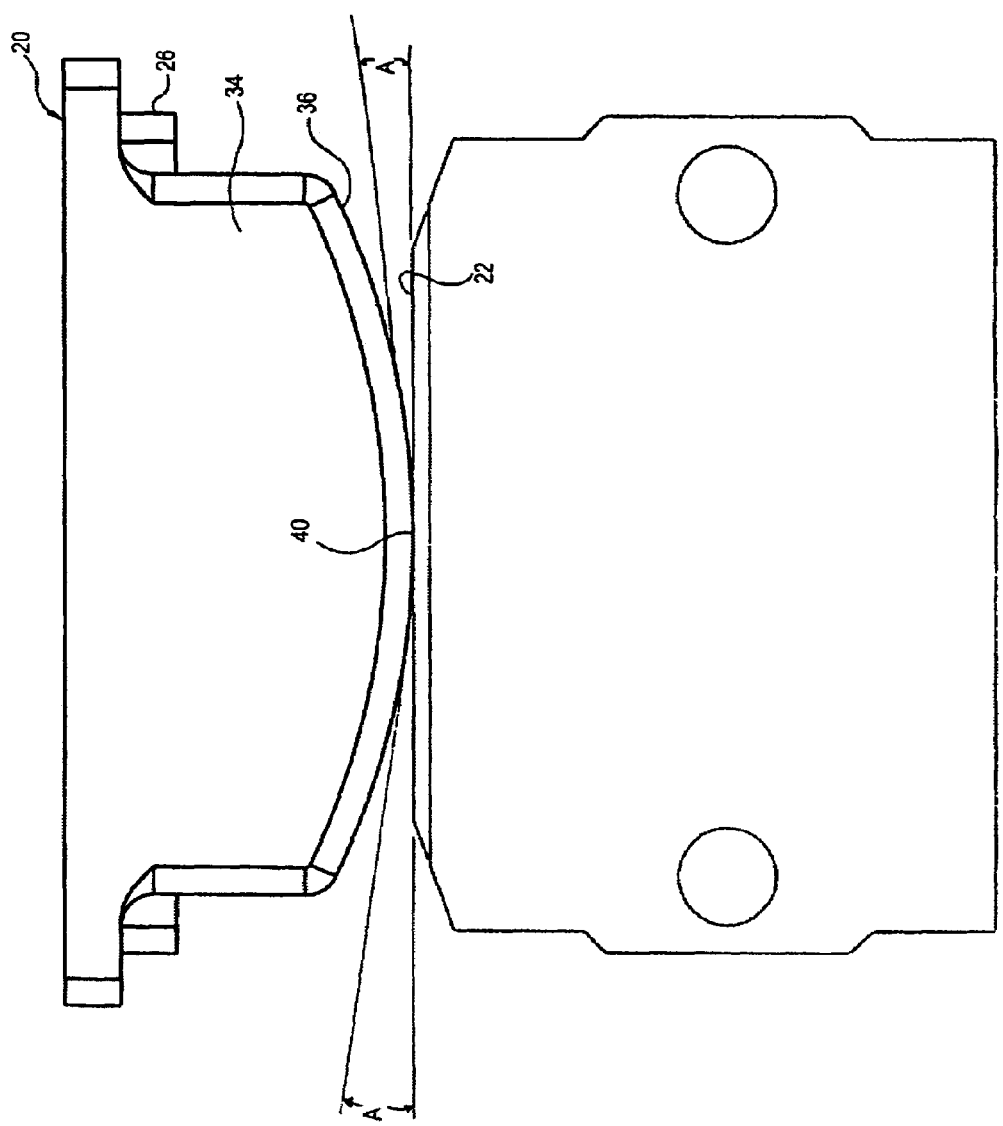
FIG. 4A is a detailed end view of a bi-directional presentation apparatus.

As best seen in FIG. 4A, the bottom surface 36 of the contact member 34 is arcuate in form. The arcuate bottom surface 36 provides an attack angle A, which is preferably between 10° and 20°. The attack angle enables a gentle approach for the document 16 between the bi-directional presentation apparatus 20 and the CIS 18, thereby minimizing friction and maintaining the velocity of the document 16. As shown in FIG. 4A, the arcuate form of the bottom surface 36 provides the attack angle A on both sides of the contact member 34, thereby enabling the presentation apparatus 20 to be "bi-directional" (i.e. the document may easily pass through either side).

Figure 4B:
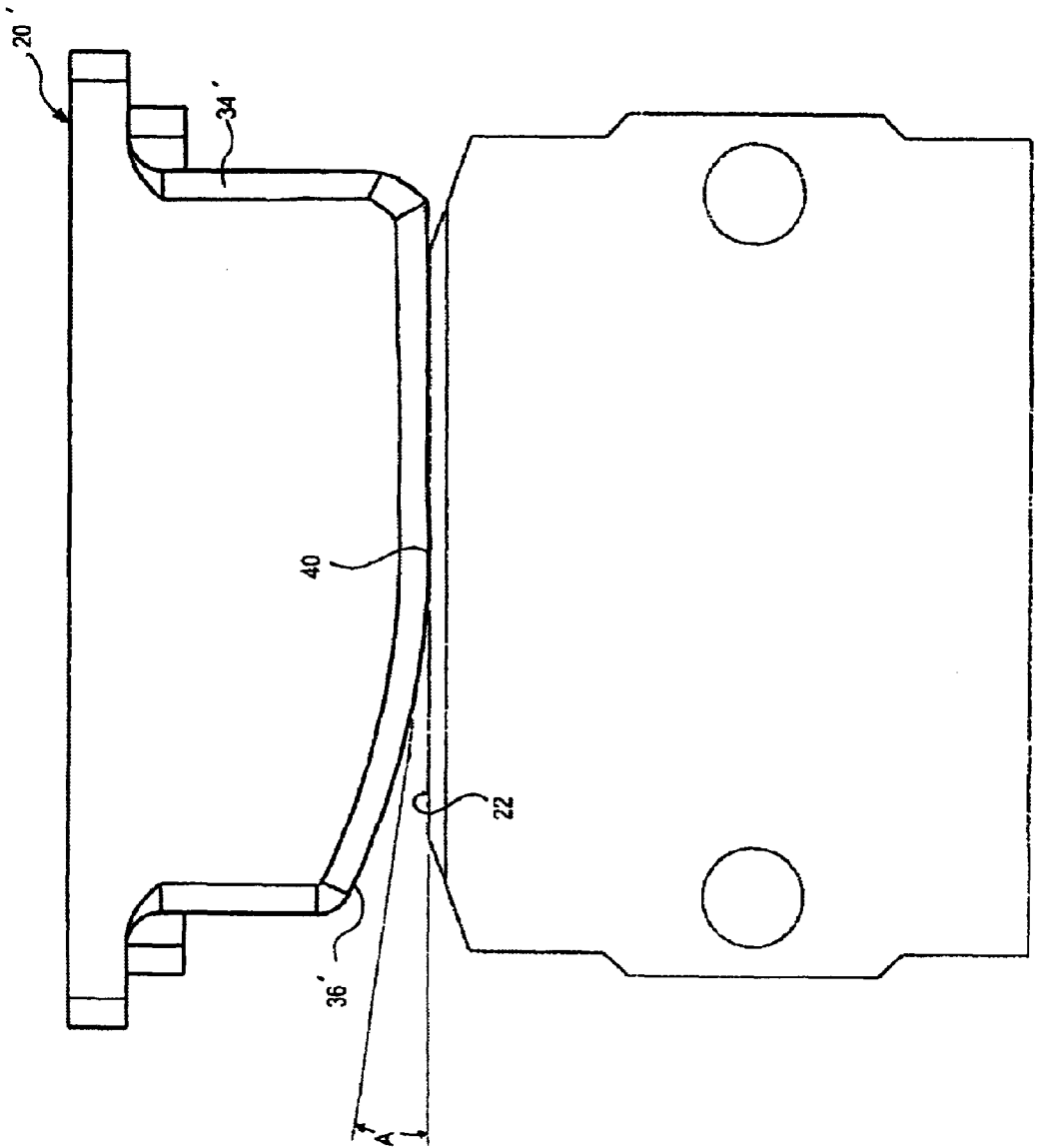
FIG. 4B is a detailed end view of a uni-directional presentation apparatus.

As seen in FIG. 4B, an alternative embodiment provides a "uni-directional" presentation apparatus 20'. The uni-directional presentation apparatus 20' includes a contact member 34' having a bottom surface 36' that is partially arcuate in form. The uni-directional apparatus 20' would be implemented in image-scanning devices that are generally limited to passing the document 16 through one side of the scanning unit 12.

The arcuate form of the bottom surface 36,36' of either presentation apparatus 20,20', further includes an apex point 40. The apex point 40 is positioned directly opposite to internal image-sensing elements (not shown) of the CIS 18. In this manner, as the document 16 passes between the presentation apparatuses 20,20' the apex point 40 ensures that the document 16 is flat against the glass surface 22 at the point where image-scanning occurs.

The bi-directional presentation apparatus 20 may be constructed from any one of a number of materials. The type of material is dependent upon the particular functional and design characteristics. For example, the type of document paper used, the probability of irregularities in the document paper and the presence of foreign objects, among many others, are considerations for material choice. Generally, the material should be a low-friction, wear resistant material having good spring qualities. Such materials may include thermoplastic, or ferrous and non-ferrous materials. In the case of thermoplastics, possible resins include, but are not limited to, acetal, polypropylene, polyethylene, and NYLON. Alternatively, the bi-directional presentation apparatus 20 may be manufactured from spring steel, stainless spring steel, beryllium copper, Havar (a cobalt-based alloy), and the like. Low friction is beneficial to the proper operation of the device 10. High friction creates drag on the document 16, thereby requiring a higher feeding force to pass the document through the scanning unit 12. Further, it is foreseen that the bi-directional presentation apparatus 20 may manufactured using any one of a number of methods known in the art, including, but not limited to, injection molding or stamping.

Figure 5:
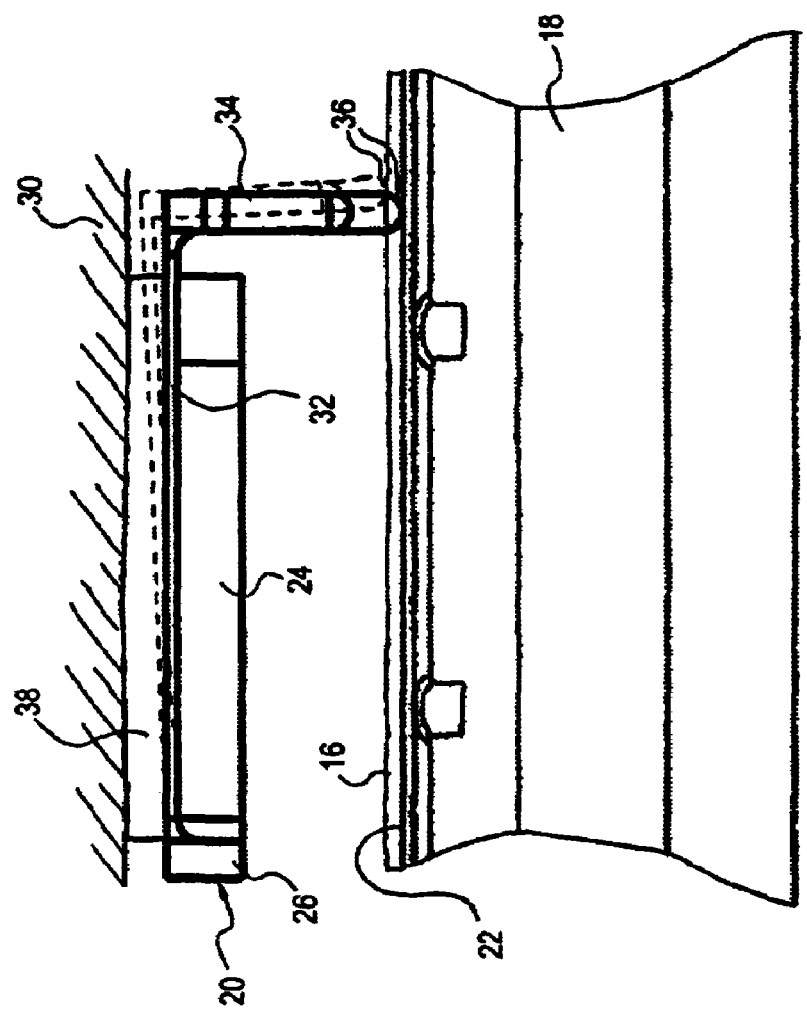
FIG. 5 is a detailed side view of the bi-directional presentation apparatus.

With particular reference to FIGS. 1 and 5, operation of the bi-directional presentation apparatus 20 will be described in detail. The document 16 is driven by the feeding system 14, through the upper and lower scanning units 12,13, thereby sliding between the bottom edge 36 of the contact members 34 and the glass surface 22 of the CIS 18. The thickness of the document 16 vertically displaces the contact members 34 against a biasing force of the cantilever arms 32. This is represented in phantom. It should be noted, however, that, for illustration purposes, the movement of the contact member 34 and cantilever arms 32 is slightly exaggerated. Because the document 16 biases the contact member 34 and cantilever arms 32 upward, a reaction force is present, whereby the bottom edge 36 of the contact member 34 urges the document 16 into flat engagement with the glass surface 22. The reaction force is sufficient to provide a good interface between the glass surface 22 and the document 16, without pinching the document 16 or otherwise hindering the rate at which the document 16 travels through the scanning unit 12.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A presentation apparatus for biasing a document into contact with a surface, the presentation apparatus comprising:
    a base member adapted to be disposed above the surface;
    a first spring arm extending from said base member; and
    a contact member including a bottom surface having an arcuate portion and extending vertically from said first spring arm;
    wherein said first spring arm urges said contact member into contact with the surface for ensuring flat contact between the document and the surface as the document passes therebetween.

2. The presentation apparatus of claim 1, wherein said arcuate portion includes an apex adapted to be urged against the surface by said first spring arm.

3. The presentation apparatus of claim 1, further comprising a second spring arm extending from said base member and interconnected with said contact member.

4. A scanning unit of an image-scanning device used to scan a document, the scanning unit comprising:
    a contact image sensor having a scanning surface;
    a presentation apparatus disposed above said scanning surface, said presentation apparatus including:
    a base member;
    a first spring arm extending from said base member; and
    a contact member including a bottom surface having an arcuate portion and extending vertically from said first spring arm;
    wherein said first spring arm urges said contact member toward said scanning surface for ensuring flat contact between the document and the scanning surface as the document passes therebetween.

5. The scanning unit of claim 4, wherein said arcuate portion provides an attack angle for enabling smooth reception of the document between said contact member and said scanning surface.

6. The scanning unit of claim 4, wherein said arcuate portion includes an apex arranged to be urged toward the surface.

7. The scanning unit of claim 4, further comprising a second spring arm extending from said base member and interconnected with said contact member.

8. An image-scanning device for scanning a document, the image-scanning device comprising:
    a scanning unit adapted to slidably receive the document therethrough, said scanning unit including:
    a contact image sensor having a scanning surface;
    a presentation apparatus disposed above said scanning surface, said presentation apparatus including:
    a base member;
    a first spring arm extending from said base member; and
    a contact member including a bottom surface having an arcuate portion and extending vertically from said first spring arm;
    a drive assembly for driving the document through said scanning unit;
    wherein said first spring arm urges said contact member toward said scanning surface for ensuring flat contact between the document and the scanning surface as the document passes therebetween.

9. The image-scanning device of claim 8, wherein said arcuate portion provides an attack angle for enabling smooth reception of the document between said contact member and said scanning surface.

10. The image-scanning device of claim 8, wherein said arcuate portion includes an apex contacting the surface.

11. The image-scanning device of claim 8, further comprising a second spring arm extending from said base member and interconnected with said contact member.

* * * * *